Oct. 23, 1945.  I. L. WOLK  2,387,378
CATALYTIC CONVERSION PROCESS
Filed March 22, 1943
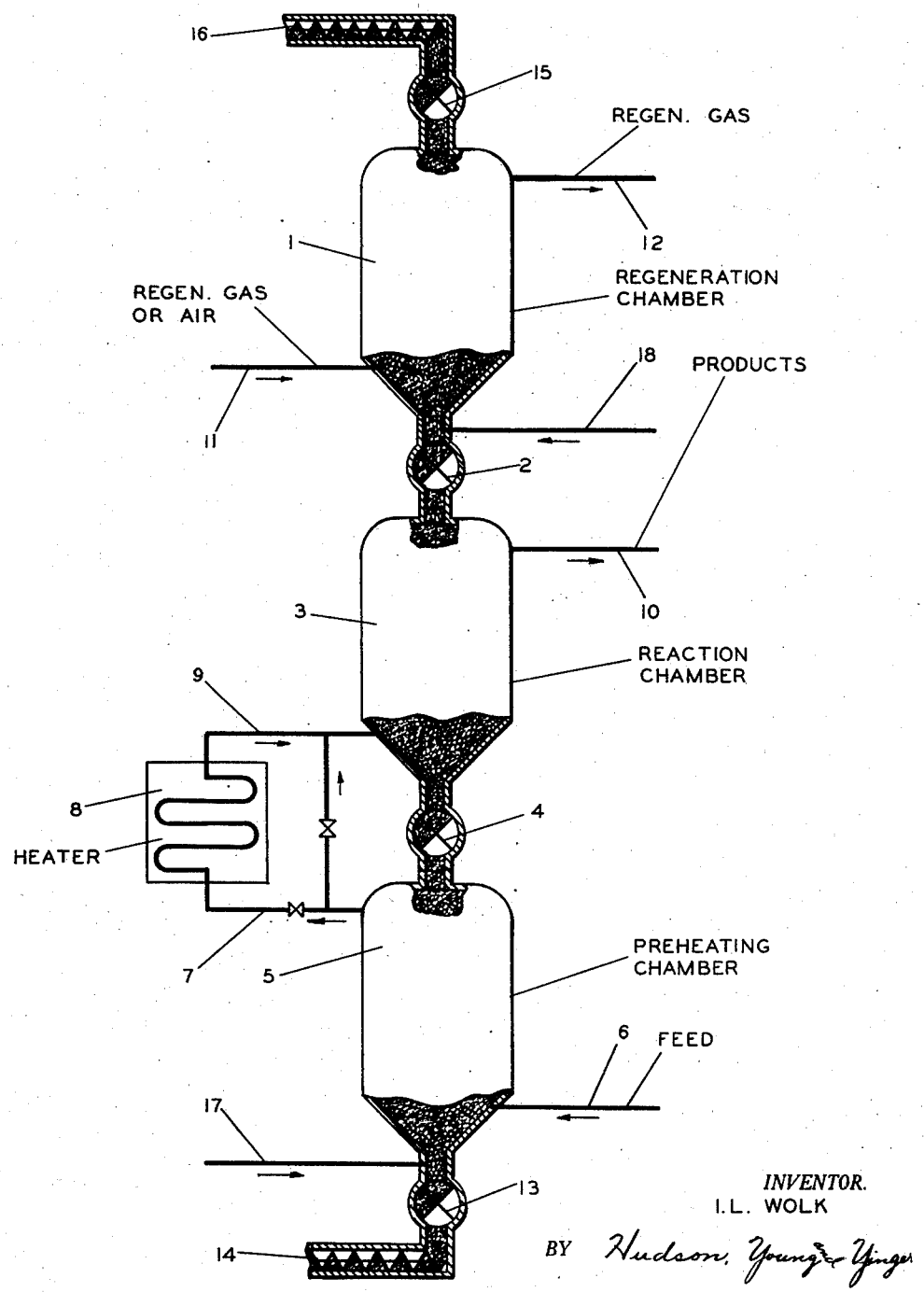
INVENTOR.
I. L. WOLK
BY Hudson, Young & Yinger
ATTORNEYS.

Patented Oct. 23, 1945

2,387,378

UNITED STATES PATENT OFFICE 2,387,378

CATALYTIC CONVERSION PROCESS

I. Louis Wolk, Bartlesville, Okla., assignor to Phillips Petroleum Company, a corporation of Delaware Application March 22, 1943, Serial No. 480,082

3 Claims. (Cl. 196—52)

The present invention relates to a method for catalytic conversion of hydrocarbons in which the catalyst is deactivated by deposition or accumulation thereon of carbonaceous or hydrocarbon-containing material which must be periodically removed, as by oxidation. More particularly it relates to an improved method for carrying out this type of conversion, in which the catalyst moves continuously or intermittently through a conversion zone and through a regeneration zone.

In processes of the type described the catalyst flowing from the reaction zone carries with it, by adsorption or otherwise, hydrocarbon materials which may include unreacted or partially reacted material as well as reaction products. In order to carry out the regeneration effectively it is desirable to remove or purge these hydrocarbon materials from the catalyst prior to regeneration proper. This is ordinarily effected by sweeping the catalyst as it leaves the reaction zone with steam or other gas. The regenerated catalyst must also be purged prior to reentering the reaction zone in order to remove adsorbed regeneration gases and especially adsorbed oxygen or excess amounts of reactive oxygen compounds carried by the catalyst.

Present methods and apparatus of this type as represented by the patent to Voorhees, 2,239,801, flow a granular catalyst by gravity, first through a reaction chamber and then through a regeneration zone, the feed being preheated to reaction temperatures or slightly above, and introduced into the reaction zone at these temperatures. The catalyst flows continuously or intermittently and the catalyst from the regeneration zone is conveyed to the top of the reaction zone when it enters another reaction-regeneration cycle. These methods, have among others, the disadvantage that the regenerated catalyst must be conveyed from the regeneration zone at the temperatures of regeneration which may be from 1000° F.–1500° F. This necessity results in serious operating difficulties due to the fact that mechanical conveying equipment must be operated at these high temperatures and frequent mechanical breakdowns in this equipment may result. Furthermore, abrasion and oxidation at these temperatures is markedly increased and rapid wear in the equipment will result. A further disadvantage is that considerable heat loss in the regenerated catalyst takes place during conveyance from regeneration zone to reaction zone and this heat loss must be compensated for by additional heat supplied to the feed or to the reaction zone. A still further disadvantage is that no real use may be made of the heat stored up in the deactivated catalyst as it leaves the reaction zone, for though it may enter the regeneration zone at reaction temperatures, heat at this point is unnecessary since the reaction is exothermic and it is in fact frequently necessary to cool the regeneration zone in order to keep temperatures therein from going too high and overheating the catalyst.

It is an object of the present invention to provide a method wherein efficient use is made of heat stored in deactivated catalyst. It is a further object of this invention to provide a method wherein the sequence of operations is so arranged that reaction and regeneration steps may be performed in an efficient manner while at the same time enabling the catalyst to be handled and conveyed at lower temperatures. It is a still further object to describe a process which will permit the direct introduction of hot regenerated catalyst into the reaction zone. Another object of the invention is to utilize hot deactivated catalyst to pre-heat feed by direct heat exchange and at the same time reduce the temperature of the catalyst to a point at which combustion may be initiated without excessive temperature rise during regeneration. Other objects and advantages will be apparent from the accompanying disclosure and discussion. Another object of the present invention is to provide for improving gas flow through the catalyst bed while at the same time obtaining improved heat exchange between zones and more uniform heat transfer within the respective beds.

The process may be described with reference to the drawing, which portrays a preferred arrangement of apparatus in which the invention may be practiced. In the drawing, I is a regeneration zone through which previously used catalyst flows by gravity. Hot flue gas admixed with a suitable amount of air, or other suitable oxygen-containing mixture, such as air alone, is introduced through 11 and flows countercurrent to the catalyst, emerging through 12. The carbon deposited on the catalyst is consumed by combustion with oxygen, the regeneration preferably taking place at 1000° F.–1300° F. The hot catalyst is continuously or intermittently removed from this zone to a reaction zone 3 positioned beneath chamber 1. The catalyst is transferred by any desired means, for example a rotary valve 2, which may be substantially gas-tight if desired. The hot catalyst then flows by gravity through reaction chamber 3 countercurrent to a stream of feed preheated to reaction temperatures in a manner hereinafter described and introduced through line 9. The reaction products are removed through line 10. In operation of the process for catalytic cracking of hydrocarbon oils, such as gas oils, the reaction temperatures in the catalyst bed may be maintained at a temperature between about 750° F.–1150° F., while the catalyst may flow through the reaction chamber at a space velocity of two or more barrels per hour per ton of catalyst material in the bed, depending on the particle size and depth of cracking desired. The space velocity of the hydrocarbon vapors is generally in the range of 0.1 to 5 volumes of charging stock per volume of catalyst space per hour. A catalyst to oil ratio of 0.5 to 10 weights of catalyst per weight of oil feed will cover most desired operations. The catalyst may conveniently be 4–60 mesh in size. Prior to introduction into the conversion zone the catalyst may be purged of adsorbed oxygen and oxygen-containing compounds by introduction of superheated steam or inert gas via line 18. The catalyst leaving the regeneration zone may desirably have a temperature in the range of 900° F.–1200° F. The temperature and volume of purge gas may be so selected that the temperature of the catalyst will be reduced to a point at or slightly above the desired reaction temperature selected from the preferred range of 750° F.–1150° F.

The catalyst may be any well known granular material suitable for the purpose such as bauxite, silica-alumina type including synthetic gels and acid-treated clays such as "Super-Filtrol," and the like.

The catalyst is removed from reaction chamber 3 by means of valve 4, which may be substantially gas tight, and flows through zone 5 countercurrent to a stream of feed, introduced at 6, which has preferably been vaporized in a heating zone (not shown). The catalyst leaving the conversion zone when the reaction is endothermic as in cracking may be at a temperature somewhat below the optimum conversion temperature, but in any case will be within 50 or 100 degrees of said temperature, or in the approximate range of 700° F.–1100° F. By contacting feed vaporized at a lower temperature with this catalyst, direct heat exchange is effected, the feed, contacting the hot spent catalyst from 3, is further heated, while the temperature of the catalyst itself drops substantially. The preheated feed leaves zone 5 by means of line 7 and may be further heated, if necessary, to reaction temperature in heater 8, being introduced via line 9 into the reaction chamber. The thus-cooled spent catalyst is removed from zone 5 via valve 13 and conveyor 14 and introduced by means of any desired conveying means (not shown) such as a bucket conveyor and by conveyor 16 through valve 15 into regeneration zone 1. The catalyst may be purged of adsorbed hydrocarbons by contact with steam or oxygen-free flue gas or the like prior to introduction into the regeneration zone by introducing such purge gas via line 17 or at the top of the regeneration zone 1. The flow rates of catalyst and feed correspond to those utilized in the conversion zone.

In the manner described above the temperature of the catalyst leaving the preheating zone is substantially reduced, but may still remain at temperatures sufficient to initiate combustion in the regeneration zone. Ordinarily this temperature may be in the range of 650° F.–850° F. Handling thereof is greatly facilitated and in addition the temperature of the catalyst is efficiently lowered to a point which will permit some compensation for the excess heat usually generated during the regeneration reaction. Thus, by introducing the catalyst at a temperature substantially lower than that at which it left the reaction zone, the peak temperature resulting in the combustion zone will be reduced. Furthermore, this method of cooling does not result in loss of valuable heat, since the heat removed is utilized effectively and directly in preheating the charge stock.

*Example*

A moving bed catalytic cracking system corresponding to that shown in the drawing and described above has a nominal capacity of 1000 barrels per day. The catalyst is an acid-treated bentonite clay of about 10 to 20 mesh. The cracking stock is passed into the system at a space velocity of one volume of liquid per volume of reaction chamber per hour, while the catalyst to oil ratio is 4:1, that is the catalyst passes through the reaction zone at the rate of four volumes per volume of reaction space per hour.

A light gas oil fraction (35° A. P. I.) boiling predominantly between 400° F. and 625° F. is substantially vaporized and introduced at 625° F. to 650° F. into the preheating chamber where it flows countercurrent to the moving bed of catalyst from the reaction zone at a flow rate corresponding to that in the reaction zone. The spent catalyst enters the preheat chamber at a temperature of about 970° F. The gas oil vapors are preheated to 925°–950° F. and are passed to the reaction chamber at 950° F. The catalyst, after being purged with steam equal in volume to about 5 per cent of the gas oil vapors, leaves the preheat zone at about 725° to 750° F., at which temperature it is readily handled and conveyed to the regeneration zone.

In the reaction zone, catalyst enters from the regeneration zone at 1150° to 1200° F., and supplies heat for the cracking reaction so that it leaves at about 980° F. A 60 per cent conversion of the gas oil is obtained, the gasoline yield being about 52%.

A regeneration gas containing about 8 per cent oxygen is used in the regeneration zone. This gas is made by admixture of air with low-pressure steam, including the steam used in purging. Spent catalyst conveyed from the outlet of the preheat chamber reaches the inlet of the regeneration chamber at a temperature in the range of 650° to 700° F., and after passing through the regeneration zone wherein carbonaceous matter is burned off, passes on into the reaction zone as described.

In the above described process, the amount of heat which may be carried to the preheating zone is dependent to a large extent on the volume, density and specific heat of the catalyst. Where a high catalyst to oil ratio is used more heat will be carried into the preheating zone and transferred to the feed. This ratio can readily be determined for any specific set of conditions and correlated to the temperatures existing in the conversion and regeneration zones. Where it is desired to utilize a lower catalyst to oil ratio and at the same time obtain more preheating than that amount of catalyst would permit, heat carriers may be admixed with the catalyst. Such heat carriers are materials having better thermal properties than the catalyst due to higher specific heat and/or density, as well as a suitably high thermal conductivity the net effect being to provide better heat retaining and heat transfer properties than the catalyst used. Such materials are "carborundum," iron, quartz, "alundum" and other metals or refractory materials having similar properties. These materials may be utilized in the form of granules, balls or any desired shape which will readily flow from zone to zone. The relative proportion of the heat carrier utilized is variable depending on the amount of heat transfer to be effected. Ordinarily this material may be utilized in proportions corresponding to ¼ to 4 times the weight of catalyst. The size of the heat carrier particles may be equal to or smaller than the catalyst particles, but it is found that where a substantial proportion of heat retainer particles larger than the catalyst particles is admixed therewith, substantial reduction in resistance to flow, and lowered pressure drop through the beds, may result. This is particularly true where more finely divided catalysts are used, such catalysts having an increased tendency to pack. The larger heat carrier particles in this case act more or less as spacers. For use in this manner heat retainer particles ranging from 2 to 25 times as large in volume as the catalyst particles may desirably be used. In the example described above, using 30 mesh catalyst, if the catalyst is admixed with an equal volume of 4 mesh carborundum and a catalyst-oil ratio of 1:5 parts by weight of catalyst to oil is used, heat transfer of the same order may be effected with a substantial reduction in the pressure drop through the bed. In general, the use of heat retaining material admixed with catalyst permits a lower rate of circulation of solid matter through the system for a given amount of heat transfer, or a greater amount of heat transfer if the amount of solid matter circulated is kept the same.

While the present process is particularly adapted to the operation with moving bed catalysts in view of handling and abrasion problems and the like, the principles thereof may be utilized in fixed bed operation in order to conserve residual heat in the reaction zone following reaction. This may be accomplished, for example, by utilizing three catalyst chambers containing fixed catalyst in a manner similar to that described for moving catalyst beds. The three chambers are alternately on regeneration, conversion and preheating stages, using the hot deactivated bed for preheating feed to the fresh catalyst. This may be readily accomplished by switching flow of feed and regenerating gas from one zone to another in known manner.

Ordinarily, vapor phase operation is to be preferred but the principles of the present invention may also be applied to liquid phase operation in which the hydrocarbons to be converted are maintained in liquid condition at the conversion temperatures through the use of higher pressures. Although the drawing and description thereof have referred primarily to three chambers of equal size through which the catalyst moves, it may in some cases be preferable to provide one or more chambers of size different from another, as when different contact times or space velocities are desired in the regeneration, reaction, and/or preheating zones. These and various other modifications will be obvious to one skilled in the art, and may be used without departing from the spirit of the invention.

I claim:

1. In a process for the catalytic cracking of hydrocarbon oil vapors by contact with a cracking catalyst under cracking conditions of temperature the steps which comprise flowing hydrocarbon oil vapors preheated to a temperature in the range of 750° F.–1150° F. countercurrent to a moving bed of cracking catalyst in a cracking zone, withdrawing cracked products from said cracking zone, flowing deactivated catalyst at a temperature of 700° F.–1100° F. through a preheating zone in direct contact with and countercurrent to vaporized hydrocarbon oil feed introduced at a lower temperature to preheat said feed and cool said deactivated catalyst, further heating said preheated feed in a separate heating zone to a temperature in the catalytic cracking range and introducing same into said cracking zone, introducing said cooled deactivated catalyst into a regeneration zone for the combustion of carbon deposited thereon, withdrawing hot regenerated catalyst at a temperature in the range of 1000° F.–1300° F. from said regeneration zone, cooling said catalyst to the approximate cracking temperature desired in said cracking zone, and introducing said hot catalyst into said cracking zone.

2. A method for the catalytic conversion of hydrocarbons at elevated temperatures which comprises preheating said hydrocarbons to conversion temperature in the manner hereinafter described, contacting said preheated hydrocarbons with a flowing bed of granular conversion catalyst in a conversion zone, flowing said catalyst at substantially conversion temperature and in at least partially spent condition due to deposition of carbonaceous materials into a preheating zone while removing conversion products from said conversion zone, directly contacting hydrocarbons to be converted with said catalyst in said preheating zone, said hydrocarbons being introduced into said preheating zone at a lower temperature than said catalyst therein, whereby a substantial proportion of the sensible heat of said catalyst is transferred to said hydrocarbons and said hydrocarbons are partially preheated to a temperature below the desired conversion temperature and the temperature of the at least partially spent catalyst is correspondingly reduced, further flowing said partially preheated hydrocarbons through a supplementary heating zone to elevate the temperature thereof to the desired conversion temperature and then introducing said preheated hydrocarbons into said conversion zone; withdrawing partially cooled catalyst from said preheating zone, flowing said partially cooled catalyst to a reactivation zone, contacting said catalyst with an oxidizing gas under combustion conditions in said zone to burn off carbonaceous deposits therefrom and reheat the catalyst to a temperature above that at which it was introduced into said reactivation zone, withdrawing said reactivated catalyst from said reactivation zone in a heated condition, and reintroducing said reactivated catalyst into said conversion zone.

3. A method for the catalytic cracking of hydrocarbons which comprises preheating said hydrocarbons to catalytic cracking temperatures in the manner hereinafter described, contacting said preheated hydrocarbons with a moving bed of cracking catalyst flowing countercurrent thereto in a cracking zone, removing the cracked products from one end of said cracking zone, removing said catalyst in at least partially spent condition due to deposition of carbonaceous materials from the other end of said cracking zone, flowing said catalyst from said cracking zone at substantially cracking temperature into a preheating zone, flowing hydrocarbon feed to be cracked countercurrent to said catalyst in direct contact therewith in said preheating zone, said feed being introduced into said preheating zone at a temperature lower than that of the catalyst therein, whereby a substantial portion of the sensible heat of said catalyst is imparted to said feed and said feed is preheated to a temperature below the desired cracking temperature while the temperature of the at least partially spent catalyst is correspondingly reduced, flowing said partially preheated feed through a supplementary heating zone to elevate the temperature thereof to the desired cracking temperature, and then introducing said preheated feed into said cracking zone; withdrawing said partially cooled catalyst from said preheating zone, introducing said cooled catalyst into a reactivation zone in countercurrent contact with a stream of oxygen-containing gas under combustion conditions to burn off carbonaceous deposits therefrom and reheat said catalyst to a temperature above that at which it was introduced into said reactivation zone, withdrawing said reactivated catalyst from said reactivation zone in a heated condition, and reintroducing said heated catalyst into said cracking zone.

I. LOUIS WOLK.